June 20, 1961 M. J. MANAHAN 2,989,688
SATURATION PERMEABILITY TUNED TRANSISTOR RADIO
Filed June 5, 1957
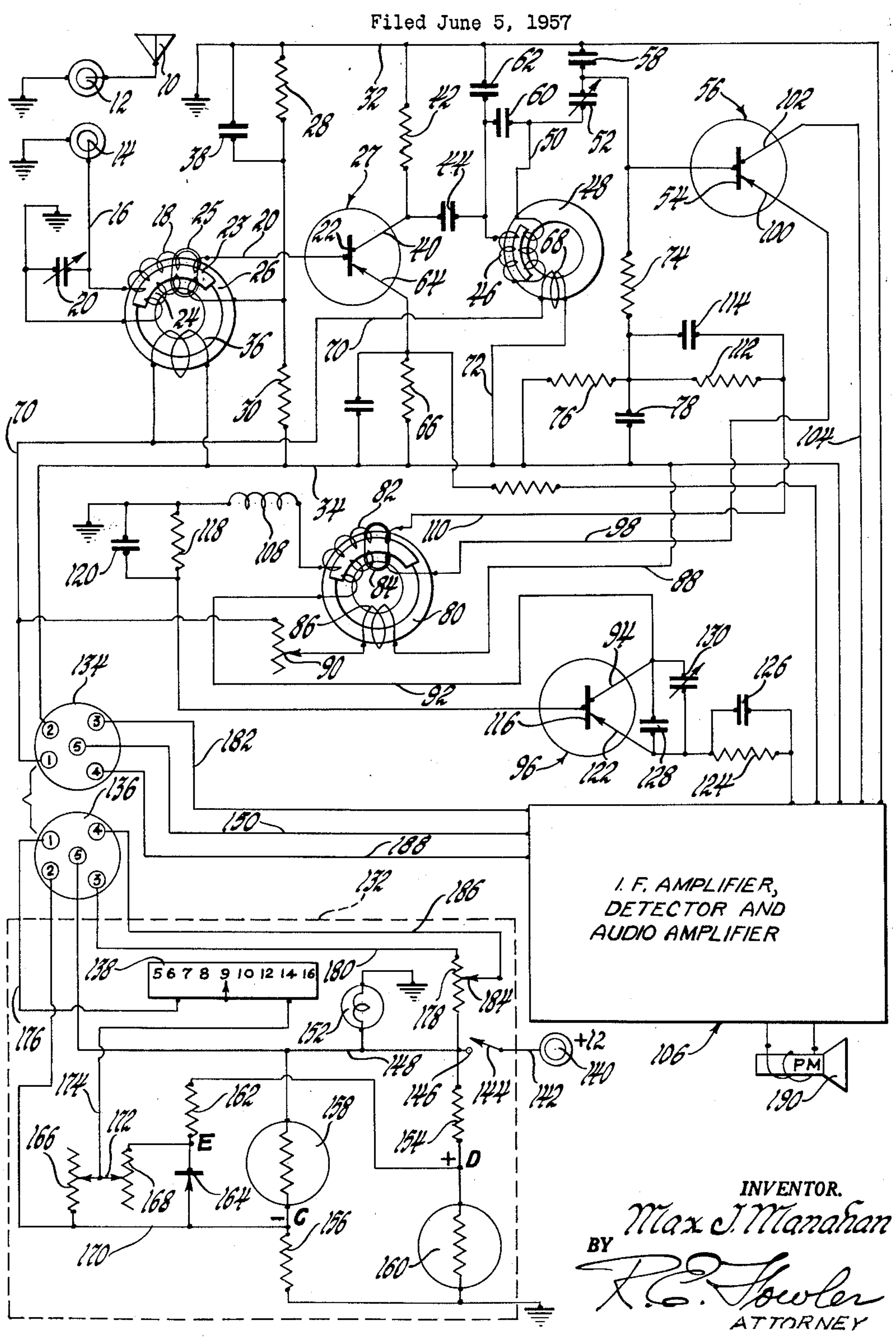
INVENTOR.
Max J. Manahan
BY R. C. Fowler
ATTORNEY 2,989,688
Patented June 20, 1961

2,989,688
SATURATION PERMEABILITY TUNED TRANSISTOR RADIO

Max J. Manahan, Kokomo, Ind., assignor to General Motors Corporation, Detroit, Mich., a corporation of Delaware Filed June 5, 1957, Ser. No. 663,645
3 Claims. (Cl. 323—89)

This invention relates to means for tuning radio receiving apparatus and more particularly to means for tuning by changes in inductance in the tunable resonant circuits by varying the saturation of the core means associated with those inductances. Radio receiving apparatus has long been tuned to certain carrier frequencies by the simultaneous variation of either the capacity or inductance in a plurality of tunable resonant circuits. In the earlier years it was common practice to tune the receiver by mechanically moving condenser plates to change the capacity. Later, the tunable circuits were adjusted by varying the inductance through movement of comminuted iron cores which were moved into and out of inductance coils to change the inductance thereof. It is also known that the effective inductance of a coil may be changed by changing the magnetizing flux in a core upon which the coil is wound. This latter type may be called saturation tuning. Such a type of tuning is fully described for a radio receiver in my copending application Serial No. 454,504 entitled Electric Radio Tuner, filed Sept. 9, 1954 which issued as Patent No. 2,882,391 on April 14, 1959.

Since any variation in the magnetizing current flowing through a magnetizing coil on the cores for the inductances will vary the value of the inductance, such magnetizing currents must be stabilized in order to maintain the proper tuning for a station to which the operator is listening, even though the supply voltage for the receiver may vary to a considerable extent. This is particularly true in radio receiving apparatus which is mounted on automotive vehicles. While the voltage of the batteries currently being installed in automobiles are rated as 12-volt batteries and systems, the actual voltage in said systems during operation of the vehicle may easily vary from 10 volts to 15 volts. It is therefore necessary to provide voltage regulating means to supply a substantially constant voltage to the tuning saturating coils in order to properly operate the receiver.

It is therefore an object in making this invention to provide voltage regulating means for saturable tuning radio apparatus.

It is a further object in making this invention to provide voltage regulating means for providing a substantially constant magnetizing voltage from a direct current source which varies over a wide range.

It is a still further object in making this invention to provide a transistorized saturable tuned remote control radio receiver.

With these and other objects in view which will become apparent as the specification proceeds, my invention will be best understood by reference to the following specification and claims and the illustrations in the accompanying drawings, in which:

The figure is a circuit diagram of a radio receiver which is tuned by variation of the ganged inductances through change in saturation of the cores upon which they are mounted, to which my novel voltage regulating system has been applied.

Referring now more particularly to the figure, there is shown therein an antenna 10 connected to an input terminal 12 which is associated with a mating terminal 14 to supply an incoming signal through line 16 to primary inductance 18 which forms a part of the tunable radio frequency antenna circuit. An adjustable condenser 20 completes the tunable antenna circuit and is connected across primary inductance 18 and ground. Primary inductance 18 consists, as shown, of two parts wound on two different arcuate sections 23 and 24 of the core 26. This is to balance out any hum produced by the saturating winding. A split secondary winding 25 is also wound over the primary having one terminal connected through line 21 with the input or base electrode 22 of transistor 27 which forms the radio frequency amplifier stage. The other terminal of secondary 25 is connected intermediate two resistances 28 and 30 which act as a potential divider to provide the proper bias voltage at the base of transistor 27 and are connected in series between ground line 32 and power line 34. Also wound on common core 26 is a saturating winding 36 and the variation in the current flow through this winding varies the inductance to cause the tunable circuit to scan the prescribed frequency band. A high frequency bypass condenser 38 is connected across a resistor 28.

The radio frequency stage transistor 27 has its collector electrode 40 connected through biasing resistor 42 to ground line 32 and also through a coupling condenser 44 to one terminal of the compound tuning inductance 46 for the next stage of the amplifier which inductance 46 is wound on a core 48 similar to core 26 whose saturation is to be altered for tuning purposes. The opposite terminal of tuning coil 46 is connected through line 50 to adjustable condenser 52 and thus to the base electrode 54 of the mixing stage transistor 56. Filtering bypass condenser 58 is connected between base 54 and the ground line 32. Condenser 60 which is connected in shunt to the tuning inductance 46, completes the tuning circuit for this stage. A further filtering bypass condenser 62 connects one terminal of the tuning inductance 46 to ground. The emitter electrode 64 of the radio frequency transistor 27 is connected through biasing resistor 66 to power supply line 34 in order to apply the proper emitter voltage to this stage. The saturating winding 68 wound on core 48 to change the saturation and tune coil 46 is connected in parallel with coil 36 of the first stage through lines 70 and 72. A filter and biasing section includes a resistance 74 directly connected to base electrode 54 of transistor 56 and a series resistor 76 connected thereto and thence to the power line 34. A shunt condenser 78 is connected around resistance 76.

The third tunable oscillator section includes saturable core 80 upon which is wound a primary tunable coil 82, wound in two sections as was coil 18. A secondary pick up coil 84 is wound over the primary 82 and an adjustable saturating coil 86 for tuning completes the assembly. Coil 86 is also connected in parallel with the other two coils 36 and 68, by having one terminal connected through line 88 to the power line 34 and the other terminal connected through an adjustable potentiometer 90 with line 70. The secondary coil 84 has one terminal connected through line 110 and resistance 112 to a point intermediate resistors 74 and 76 and the other terminal of said coil 84 being connected through line 98 with the emitter electrode 100 of the transistor 56 to inject the oscillator signal into the mixer stage. Condenser 114 shunts resistance 112. The output from transistor 56 is fed from its collector 102 through line 104 to the I.F. amplifier, detector and audio amplifier shown in block diagram at 106. Primary tuning coil 82 has one terminal connected through series inductance coil 108 to ground. The other terminal of coil 82 is connected through line 92 to the collector electrode 94 of transistor 96. The base electrode 116 of transistor 96 is connected to ground through biasing resistor 118 bypassed by condenser 120. The emitter electrode 122 of transistor 96 is connected to a power supply line in the detector and audio amplifier section through resistor 124 which is shunted by condenser 126. Two condensers 128 and 130, the last of which is adjustable, are connected in parallel across the emitter and collector electrodes 122 and 94 of transistor 96 to determine the frequency of oscillation. This portion of the receiver illustrates a saturation tuned transistorized receiver.

In order to tune the antenna, R.F. and oscillator section, it is necessary to vary the current flow through the saturating windings 36, 68 and 86 respectively. This of course must be done simultaneously so that each may be changed to the proper frequency. As shown in the figure, the means for tuning the set has been indicated as a remotely positioned unit although it could of course be located at the same position. The dotted outline 132 shown in the lower lefthand portion of the drawing is the tuning and indicating unit and is connected to the main set through a detachable coupling consisting of two halves 134 and 136 upon which mating conductors are indicated by the same numerals, 1 through 5.

In the remote unit, there is provided an indicating meter 138 which may be any suitable type of milliameter calibrated in frequency. The main battery voltage of the car is connected to terminal 140 which feeds through line 142 to the main off and on switch arm 144. This arm engages stationary contact 146 which is directly connected through line 148 with terminal 5 in the disconnect plug half 136. This of course mates with terminal 5 in the half 134 to feed A battery power to the major part of the set through line 150. Indicating light 152 is connected between line 148 and ground to show when the set is energized.

The voltage regulating section consists of a balanced bridge which includes two resistances 154 and 156 and varistors 158 and 160. The bridge is fabricated by connecting resistor 154 and varistor 160 in series between power line 148 and ground and then by connecting varistor 158 and resistor 156 in series relation between the same two lines to form a parallel circuit. The varistors are resistors with a so-called negative voltage characteristic. This means that the resistance decreases with an increase in voltage across the varistor. Connected across the bridge circuit just described is a resistance 162 in series with a silicon diode 164 of the Zener type. The actual physical adjustable means actuated by the operator for varying the tuner consists of a manual control formed of two resistors 166 and 168. One terminal of resistor 166 is connected to line 170 which extends to the center of the bridge. The other end of the resistor 166 is open. In like manner, one terminal of the resistor 168 is connected to a point intermediate resistor 162 and diode 164, the other terminal being open. A common adjustable arm 172 is provided to move over these two resistors simultanously increasing the amount of one resistance to be included in the circuit and reducing the other. This is the tuning control. It is electrically connected through line 174 with one terminal of the milliameter indicator 138. The other terminal of the milliameter 138 is connected through line 176 to terminal 1 on plug half 136. Line 170 previously described is connected to terminal 2 on that same half. Mating terminals 1 and 2 of the plug half 134 are connected to line 70 and 34 respectively.

A volume control is also provided at the remote control unit which consists of a resistor 178, one terminal of which is connected to power line 148 and the other terminal through line 180 to terminal 3 of the disconnect plug half 136. Mating terminal 3 of the half 134 is connected through line 182 to the detector where volume regulation is provided. The adjustable arm 184 movable over resistor 178 is connected through line 186 to pin 4 of the disconnect plug half 136 and the associated pin 4 of half 134 is connected through line 188 to the main set for the completion of the volume control circuit. Thus, movement of the arm 184 changes the volume in the set. A loud speaker 190 is shown connected to the output of the audio amplifier to change the variable electric currents to sound vibrations. As previously described, when the two disconnect plugs half 134 and 136 are clamped together, an energizing circuit is provided for the set. This includes a power circuit for the saturating coil windings 36, 68 and 86 and the amount of current flowing through these windings is determined by the setting of the variably positioned arm 172. As the arm 172 is moved vertically, the set is tuned over the prescribed band such for example as the normal broadcast band by changing the amount of resistance in the circuit of the saturating windings but maintaining the resistance across diode 164 substantially constant.

The operation of the voltage regulating section which provides a substantially constant voltage across the saturating coils at any given setting will now be described. The regulating bridge circuit consists of four arms including the two resistances 154 and 156 and the two varistors 158 and 160. Since this set is designed to operate generally in an automotive vehicle, the voltage of the source swings over a wide range; for example, between 11 and 17 volts. When this relatively low voltage in the range over which it is expected the supply voltage to vary is applied with the positive pole connected to terminal 140, this voltage is of course applied across the bridge. At this time, the voltage drop across C and D or in series across resistance 162 and diode 164 is considerably less than line voltage. As an example, if the battery line voltage is 11 volts, the drop through the resistances 154 and 156 reduces the voltage across points C and D to about 8.5 volts with the polarities as indicated. As the voltage applied across the bridge is increased, the voltage drop across the varistors 158 and 160 tends to increase, thus causing the resistance in each to decrease, since they have negative resistance characteristics mentioned above. This drop in resistance in varistors 158 and 160 increases the current flow through the resistors 154 and 156 to increase the voltage drop thereacross. This tends to maintain the voltage across C and D constant or regulate the voltage across the series circuit formed of resistor 162 and diode 164, and in actual experimentation, when the supply voltage on line 148 varied from 11 to 18 volts, the variation in voltage across the series circuit formed of resistor 162 and diode 164 was less than one-half volt. The series circuit 162—164 further improves the voltage regulation in itself since silicon Zener diodes have excellent voltage regulation in the region of breakdown, which is the region of operation, a large change in current producing only a small voltage change and a relatively constant impedance load is connected across the Zener diode to further improve regulation. For the exemplary circuit shown, a Zener diode having a breakdown voltage of 6.5 volts may be used. With resistance 162 in series with the diode, a constant impedance load is provided between points C and D. Since the circuitry so far described provides a substantially constant voltage across the diode 164, it is desired to take full advantage of this by the application of a relatively constant impedance load across points C and E and yet vary the current through the magnetizing windings over a sufficient range. This is accomplished through the use of the resistances 166—172 and 168—172 connected in circuit as shown and enables the operator to vary the current through the magnetizing windings for tuning to any broadcast frequency without appreciably changing the load on the voltage regulating section.

In actual construction and operation of this type of receiver by providing two units, one an operating and the other a remote control unit, the operating unit may be placed at any location within the vehicle body and the small remote control unit will not require much space in crowded areas such as behind the instrument panel. When the two units are mounted and the disconnect plug halves 134 and 136 are pressed together, the set may be operated by closing the main switch 144—146 mounted in the remote control unit and then moving arm 172 over its associated resistors 166 and 168 to vary the saturating current in windings 36, 68 and 86. As this current varies, the ammeter 138 which has been calibrated in terms of frequencies, will indicate the location in the band of the tuning means and enable the operator to locate desired stations. The lamp 152 in the remote control unit indicates that the device is in operation. If the operator desires to change the volume of the set, he merely moves contact 184 to adjust the volume in the remote set.

I claim:

1. In radio receiving apparatus having variable inductance tuning means, core means upon which said variable inductance tuning means is mounted and magnetizing means mounted on said core means to vary the saturation and change the value of the inductance means for tuning purposes, the combination including a source of electrical power which fluctuates over a wide range of voltage, a bridge circuit having a plurality of arms including a varistor in opposite arms and having an input and an output circuit, said input circuit being connected across said source of electrical power and compound variable resistance means having a plurality of resistance elements and an adjustable tap simultaneously movable over both, opposite ends of the resistance elements being connected to the bridge output circuit and the adjustable tap to the magnetizing means so that movement of the adjustable tap increases the amount of one resistance element in circuit and simultaneously reduces the other, said compound variable resistance means supplying regulated power to said magnetizing means and adjusting the same without altering the impedance of the output circuit of the regulating bridge circuit.

2. In radio receiving apparatus having variable inductance tuning means, core means upon which variable inductance tuning means is mounted, and magnetizing means mounted on said core means to vary the saturation and change the value of the inductance means for tuning purposes, the combination including a source of electrical power which fluctuates over a wide range of voltage, a bridge circuit having a plurality of arms including a varistor in opposite arms and having an input and an output circuit, said input circuit being connected to said source of electrical power, a series circuit of resistance and Zener diode rectifier means connected across the bridge output circuit and compound variable resistance means having a plurality of resistance elements and an adjustable tap simultaneously movable over both, opposite ends of the resistance elements being connected in shunt to the Zener diode rectifier means and the adjustable tap to the magnetizing means so that movement of the adjustable tap increases the amount of one resistance element in circuit and simultaneously reduces the other, said compound variable resistance means supplying adjustable regulated power to the magnetizing means.

3. In radio receiving apparatus having variable inductance tuning means, core means upon which said variable inductance tuning means is mounted and magnetizing means mounted on said core means to vary the saturation and change the value of the inductance means for tuning purposes, the combination including, a source of electrical power which fluctuates over a wide range of voltage, a remote control unit for the radio receiving apparatus, a bridge circuit in said remote control unit, varistor and resistor means included in opposite arms of the bridge to form the same, said bridge having an input and an output circuit, means for connecting said source of electrical power to said bridge input circuit, resistance means and a Zener diode connected in series to the output circuit of the bridge, compound variable resistance means having a plurality of resistance elements and an adjustable tap simultaneously movable over both, opposite ends of said resistance elements being connected in shunt across the Zener diode and said adjustable tap being connected to said magnetizing means to supply power thereto, movement of said adjustable tap increasing the amount of one resistance element in circuit and simultaneously reducing the amount of the other to vary the power take off to the magnetizing means without changing the value of the total resistance in shunt with the Zener diode and thus provide regulated power to the magnetizing means.

References Cited in the file of this patent

UNITED STATES PATENTS

| | | |
|---|---|---|
| 1,211,803 | Woodbridge | Jan. 9, 1917 |
| 2,573,280 | Schmidt | Oct. 30, 1951 |
| 2,581,202 | Post | Jan. 1, 1952 |
| 2,714,702 | Shockley | Aug. 2, 1955 |
| 2,737,343 | Hinton | Mar. 6, 1956 |
| 2,810,826 | Hargens | Oct. 22, 1957 |
| 2,849,604 | Przedpelski | Aug. 26, 1958 |

FOREIGN PATENTS

| | | |
|---|---|---|
| 531,612 | Great Britain | Jan. 9, 1941 |
| 714,626 | Great Britain | Sept. 1, 1954 |

OTHER REFERENCES

Book, "Fundamentals of Electronics and Control," by Young and Bueche, Harper Bros., 1952, page 32.